(12) United States Patent
Shimizu et al.

(10) Patent No.: US 7,953,151 B2
(45) Date of Patent: May 31, 2011

(54) MOTION VECTOR DETECTING APPARATUS

(75) Inventors: Tomoyuki Shimizu, Saitama (JP);
Yasuyuki Nakajima, Saitama (JP);
Hiromasa Yanagihara, Saitama (JP)

(73) Assignee: KDDI Corporation, Tokyo (JP)

( * ) Notice: Subject to any disclaimer, the term of this patent is extended or adjusted under 35 U.S.C. 154(b) by 1236 days.

(21) Appl. No.: 10/926,004

(22) Filed: Aug. 26, 2004

(65) Prior Publication Data
US 2005/0063468 A1 Mar. 24, 2005

(30) Foreign Application Priority Data
Sep. 24, 2003 (JP) ................. 2003-331459

(51) Int. Cl.
*H04N 11/02* (2006.01)
(52) U.S. Cl. .................... 375/240.16; 348/699
(58) Field of Classification Search ............ 375/240.16, 375/240.24; 348/699
See application file for complete search history.

(56) References Cited

U.S. PATENT DOCUMENTS

| 6,594,314 | B1 * | 7/2003 | Ando ................ | 375/240.16 |
| 7,212,573 | B2 * | 5/2007 | Winger .............. | 375/240.12 |
| 2003/0053544 | A1 * | 3/2003 | Yasunari et al. ...... | 375/240.16 |
| 2005/0013366 | A1 * | 1/2005 | Gallant et al. ....... | 375/240.16 |
| 2005/0078751 | A1 * | 4/2005 | Ghanbari et al. ..... | 375/240.16 |

FOREIGN PATENT DOCUMENTS
JP 2003-111082 4/2003
* cited by examiner

*Primary Examiner* — Marsha D Banks Harold
*Assistant Examiner* — Christopher Findley
(74) *Attorney, Agent, or Firm* — Westerman, Hattori, Daniels & Adrian, LLP

(57) ABSTRACT

A first block size motion searching device (4) detects a motion vector with respect to each of blocks by a unit of variable blocks in the smallest first block size. A feature value extracting device (6) detects a feature value between the adjacent blocks. A motion search determining device (7) determines by utilizing the feature value whether or not the motion search should be executed in the second to nth block sizes. A search center generating device (8), a search area generating device (9) and a selected block size motion searching device (10) selects the second to nth block sizes and detects the motion vector. A block size determining device (11) determines the block size having a high efficiency.

16 Claims, 4 Drawing Sheets

MOTION VECTOR DETECTING APPARATUS

BACKGROUND OF THE INVENTION

1. Field of the Invention

The present invention relates to a motion vector detecting apparatus for executing motion searches on the basis of variable block sizes so as to detect a motion vector, and more particularly to a motion vector detecting apparatus for detecting a motion vector which is used for predicting a motion compensation in a high efficiency coding of a digital motion picture signal.

2. Description of the Related Art

In the high efficiency coding system for coding the sequentially input motion picture signals by a less coding amount, there is a motion compensation prediction coding system as a coding system utilizing a correlation between the picture signals. In the motion compensation prediction coding, it is possible to widely reduce a coding amount by detecting a block having a highest correlation within a reference picture in the input picture, and coding a motion vector expressing the motion and a prediction error between the input picture and the reference picture.

It is possible to further reduce the prediction error by using variable block sizes as an area unit for executing the detection of the motion vector and the motion compensation, and it is possible to further reduce the coding amount. For example, in H.264 corresponding to an international standard of the picture coding, the coding is executed by constituting the area unit for executing the motion compensation by four kinds of block sizes comprising 8×8 pixels, 8×16 pixels, 16×8 pixels and 16×16 pixels as shown in FIGS. 1A, 1B, 1C and 1D, and selecting the block size having a higher coding efficiency among them. Further, in the case that the block size of 8×8 pixels is selected, it is possible to further separate each of the blocks into 4×4 pixels, 4×8 pixels and 8×4 pixels.

A simplest structure of the motion vector detecting apparatus for detecting the motion vector by setting variable block sizes as a unit is a system (hereinafter, refer to as a first system) of determining a motion vector which minimizes the prediction error in all the block sizes, and selecting the block size in which the prediction error is the minimum.

Further, in the following patent document 1, there is proposed a system (hereinafter, refer to as a second system) of reducing the block size to be selected in a process of the motion search, by comparing the prediction error per the block sizes in the middle of the motion search and passing over the large block size at a time when a predetermined condition is satisfied so as to execute the motion search.

[Patent document 1] Japanese Unexamined Patent Publication No. 2003-111082

In the first system mentioned above, since the motion search is executed with respect to all the block sizes, there is a problem that a calculation amount becomes huge, and a processing speed is lowered.

Further, in the second system mentioned above, since the block size to be selected is excluded in the middle of the motion searching process, a higher processing speed can be expected in comparison with the first system, however, since the motion searches of variable block sizes are executed in parallel until the partway stage, there is a problem that a lot of calculation amount is required.

SUMMARY OF THE INVENTION

An object of the present invention is to provide a vector detecting apparatus which can solve the problem mentioned above, can widely reduce a calculation amount without lowering a search accuracy very much, and can detect a motion vector by executing motion searches on the basis of variable block sizes at a high efficiency.

In order to accomplish the object, a feature of the present invention resides in that a motion vector detecting apparatus for detecting a motion vector between sequentially input picture signals by a unit of the first to nth variable block sizes (n is an integral number equal to or more than 2), comprises a first motion vector detecting means for detecting a motion vector with respect to each of the blocks by a unit of variable blocks in the smallest first block size, a feature value detecting means for detecting a feature value between the adjacent blocks on the basis of the motion vectors detected by the first motion vector detecting means, and a second motion vector detecting means for selecting the second to nth block sizes on the basis of the feature value detected by the feature value detecting means and detecting the motion vector with respect to the blocks in the second to nth block sizes.

Also, another feature of the present invention resides in that a motion vector detecting apparatus, wherein the feature value detecting means detects a vector distance between the motion vectors detected by the first motion vector detecting means or a dispersion thereof as the feature value, and the second motion vector detecting means determines by utilizing the vector distance between the motion vectors or the dispersion, which unit of the second to nth block sizes a motion search should be executed by.

Also, another feature of the present invention resides in that a motion vector detecting apparatus, wherein the second motion vector detecting means determines a search center on the basis of the feature value detected by the feature value detecting means, and detects the motion vector with respect to the blocks in the second to nth block sizes.

Also, another feature of the present invention resides in that a motion vector detecting apparatus, wherein the feature value detecting means detects a center vector of the motion vectors detected by the first motion vector detecting means as the feature value, and the second motion vector detecting means determines the search center by utilizing the center vector.

Also, another feature of the present invention resides in that a motion vector detecting apparatus, wherein the second motion vector detecting means determines a search area on the basis of the feature value detected by the feature value detecting means, and detects the motion vector with respect to the blocks in the second to nth block sizes.

Also, another feature of the present invention resides in that a motion vector detecting apparatus, wherein the feature value detecting means detects the vector distance between the motion vectors or the dispersion of the motion vector detected by the first motion vector detecting means as the feature value, and the second motion vector detecting means determines the search area by utilizing the vector distance between the motion vectors or the dispersion of the motion vectors.

Also, another feature of the present invention resides in that a motion vector detecting apparatus, wherein the variable block sizes are constituted by a first block size, a second block size having a double height of the first block size, a third block size having a double width of the first block size, and a fourth block size having a double width and a double height of the first block size, the feature value detecting means detects the vector distance between the motion vectors detected by the first motion vector detecting means, and the second motion vector detecting means selects the third block size and detects the motion vector in the case that the vector distance between the motion vectors with respect to the blocks in the first block size adjacent in a horizontal direction is small.

Also, another feature of the present invention resides in that a motion vector detecting apparatus, wherein the variable block sizes are constituted by a first block size, a second block size having a double height of the first block size, a third block size having a double width of the first block size, and a fourth block size having a double width and a double height of the first block size, the feature value detecting means detects the vector distance between the motion vectors detected by the first motion vector detecting means, and the second motion vector detecting means selects the second block size and detects the motion vector in the case that the vector distance between the motion vectors with respect to the blocks in the first block size adjacent in a vertical direction is small.

Also, another feature of the present invention resides in that a motion vector detecting apparatus, wherein the variable block sizes are constituted by a first block size, a second block size having a double height of the first block size, a third block size having a double width of the first block size, and a fourth block size having a double width and a double height of the first block size, the feature value detecting means detects the vector distance between the motion vectors detected by the first motion vector detecting means, and the second motion vector detecting means selects the fourth block size and detects the motion vector in the case that the vector distance between the motion vectors with respect to all the blocks in the first block size is small.

Also, another feature of the present invention resides in that a motion vector detecting apparatus, wherein the variable block sizes are constituted by a first block size, a second block size having a double height of the first block size, a third block size having a double width of the first block size, and a fourth block size having a double width and a double height of the first block size, the feature value detecting means detects the vector distance between the motion vectors detected by the first motion vector detecting means or the dispersion, and the second motion vector detecting means selects at least one of the second to fourth block sizes in accordance with the vector distance between the motion vectors with respect to the blocks in the first block size or the dispersion and detects the motion vector.

In the present invention, since it is determined at a time when the motion search with respect to the first block size is finished, whether or not the motion search with respect to the other block sizes is executed, and the search center and the search area of the motion search are determined by using the feature value detected on the basis of the motion vectors about the first block size, it is possible to widely reduce the processing step number required for the motion search in the other block sizes than the first block size.

Further, since the search center and the search area are determined by using the feature value detected on the basis of the motion vectors about the first block size and predicting the motion vector close to the motion vectors about the other block sizes, it is possible to execute a high accuracy motion search while reducing the processing step number of the motion search.

DETAILED DESCRIPTION OF THE PREFERRED EMBODIMENT

Figure 1A:
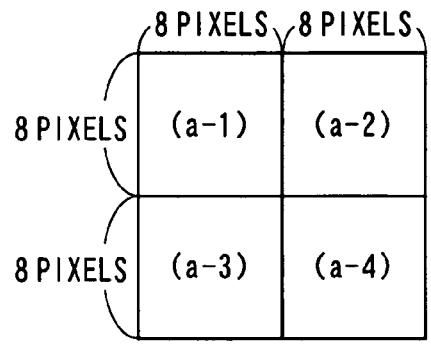
FIGS. 1A, 1B, 1C and 1D are schematic views of variable block sizes.
Figure 1B:
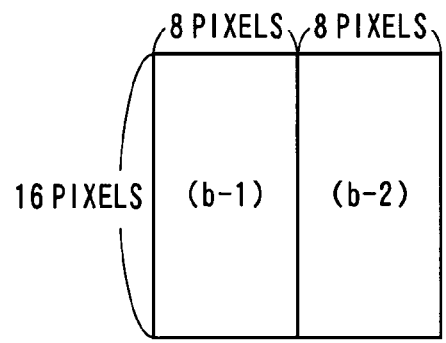
Figure 1C:
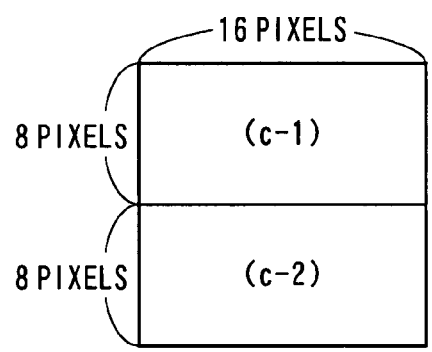
Figure 1D:
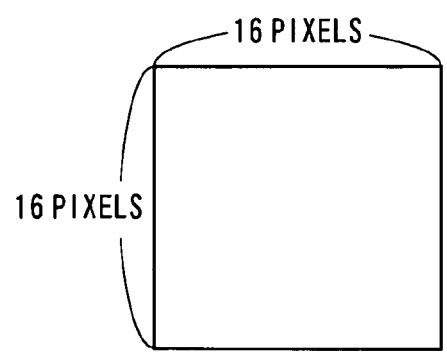
Figure 2:
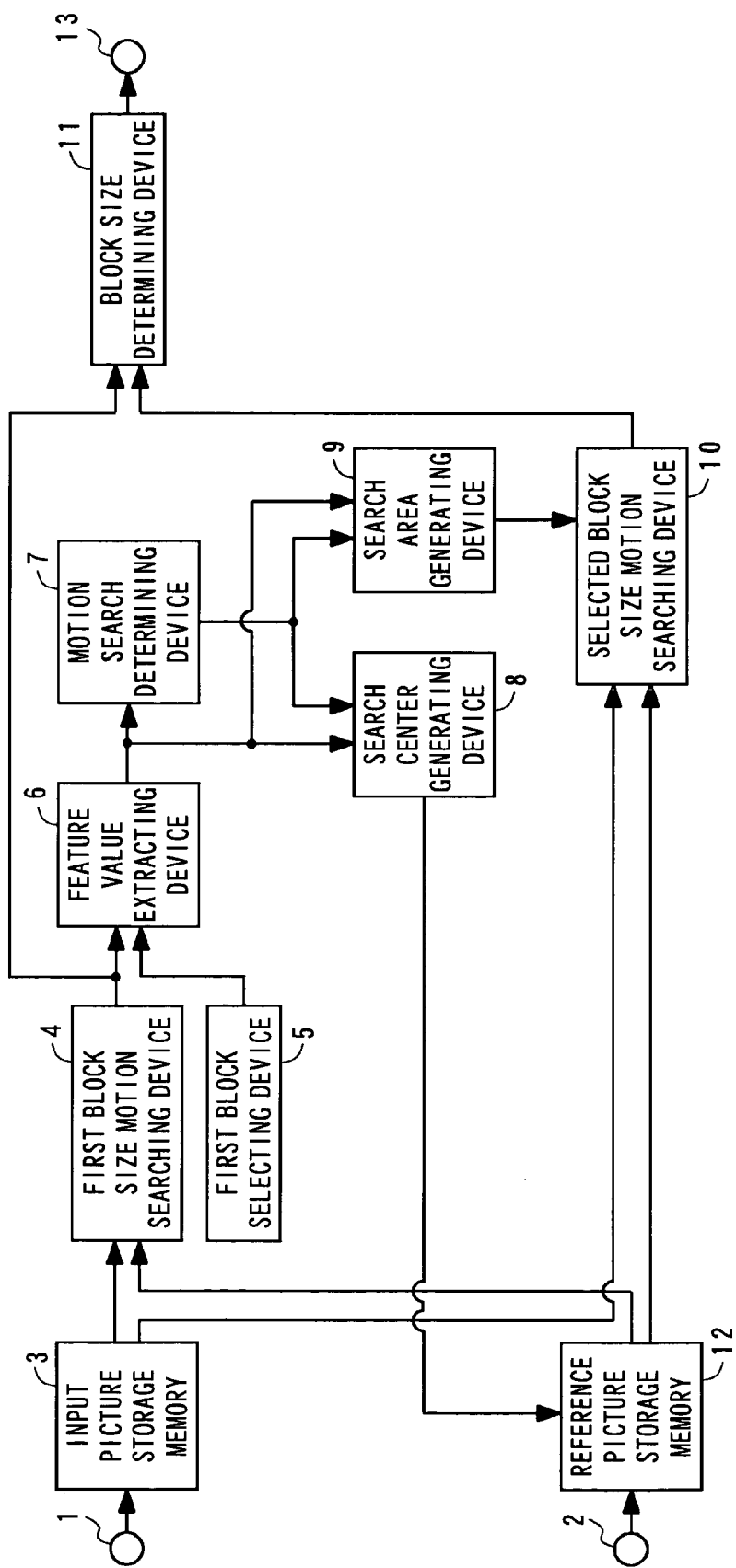
FIG. 2 is a block diagram showing a structure of one embodiment in accordance with the present invention.

A description will be given below of the present invention with reference to the accompanying drawings. FIG. 2 is a block diagram showing a structure of one embodiment in accordance with the present invention. In this case, the following description will be given of an example in which a motion detection is executed on the basis of four block sizes comprising a first block size (FIG. 1A), a second block size (FIG. 1B), a third block size (FIG. 1C) and a fourth block size (FIG. 1D) shown in FIGS. 1A, 1B, 1C and 1D.

In FIG. 2, an input picture (a motion picture) signal 1 is stored in an input picture storage memory 3, and a reference picture signal 2 is stored in a reference picture storage memory 12.

A first block size motion searching device 4 executes a motion search by a unit of the first block size between the input picture signal 1 and the reference picture signal 2 which are stored in the input picture storage memory 3 and the reference picture storage memory 12, and detects motion vectors with respect to 8×8 pixel blocks (a-1), (a-2), (a-3) and (a-4). In this case, prediction errors are also derived from the first block size motion searching device 4 in the process of the motion searching, and the prediction errors are applied to a block size determining device 11 mentioned below together with the motion vectors.

A block size selecting device 5 delivers a signal for sequentially selecting the second, third and fourth block sizes, and indicates the block size to be processed to a feature value extracting device 6.

Figure 3:
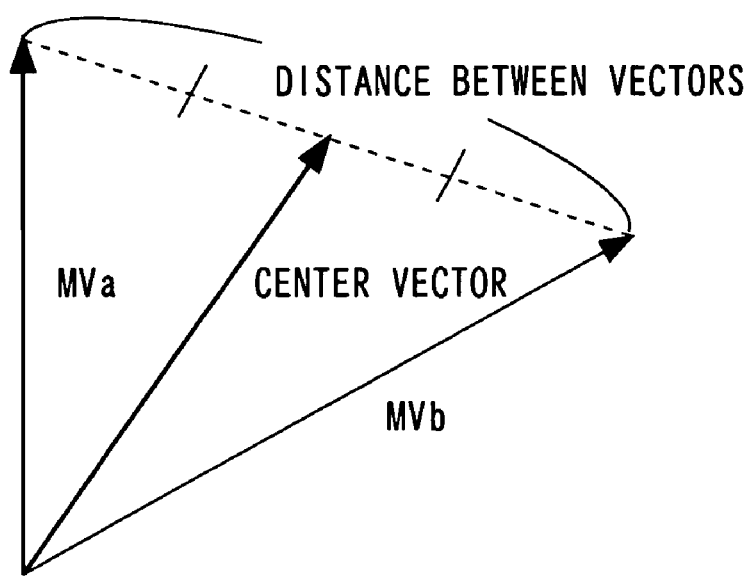
FIG. 3 is a schematic view of a center vector and a distance between the vectors.

The feature value extracting device 6 extracts the feature value on the basis of the motion vectors with respect to the 8×8 pixel blocks (a-1), (a-2), (a-3) and (a-4) detected by the first block size motion searching device 4, and the block size given by the block size selecting device 5. The feature value is, for example, a center vector of the motion vector, a distance between the vectors, a dispersion or the like. FIG. 3 shows a center vector of two vectors MVa and MVb and a distance between the vectors. Further, the dispersion means a value expressing a scattering state of a plurality of vectors.

A motion search determining device 7 determines on the basis of the feature value extracted by the feature extracting device 6 whether or not the motion search should be executed by a selected block size motion searching device 10 by a unit of the block size indicated by the block size selecting device 5. A reference for the determination can employ, for example, the distance between the vectors as mentioned below.

In the case that the block size selecting device 5 indicates the second block size, it is determined whether or not the motion search should be executed, on the basis of the matter that any one of the vector distance between the motion vectors with respect to the blocks (a-1) and (a-3), and the vector distance between the motion vectors with respect to the blocks (a-2) and (a-4) is lower than a fixed threshold value. For example, when the vector distance between the motion vectors is lower than the fixed threshold value, it is determined that the motion search should be executed on the basis of the second block size.

In the case that the block size selecting device 5 indicates the third block size, it is determined whether or not the motion search should be executed, on the basis of the matter that any one of the vector distance between the motion vectors with respect to the blocks (a-1) and (a-2), and the vector distance between the motion vectors with respect to the blocks (a-3) and (a-4) is lower than the fixed threshold value. For example, when the vector distance between the motion vectors is lower than the fixed threshold value, it is determined that the motion search should be executed on the basis of the third block size.

In the case that the block size selecting device 5 indicates the fourth block size, it is determined whether or not the motion search should be executed, on the basis of the matter that all of the vector distance between the motion vectors with respect to the blocks (a-1), (a-2), (a-3) and (a-4) is lower than the fixed threshold value. For example, when all of the vector distance between the motion vectors is lower than the fixed threshold value, it is determined that the motion search should be executed on the basis of the fourth block size.

The dispersion of the motion vector can be used for the reference of determining whether or not the motion search should be executed by the selected block size motion searching device 10 by a unit of the block size indicated by the block size selecting device 5. For example, when the dispersion of the motion vector with respect to the blocks (a-1), (a-3), (a-2) and (a-4) is more than the fixed threshold value, it is possible to execute the motion search on the basis of at least one of the second and fourth block sizes, for example, the fourth block size.

When the motion search determining device 7 determines that the search should be executed, a search center generating device 8 determines a search center at a time when the selected block size motion searching device 10 executes the motion search on the basis of the feature value extracted by the feature extracting device 6, and gives the search center to the reference picture storage memory 12. The search center indicates a block position in the reference picture which the reference picture storage memory 12 sends to the selected block size motion searching device 10. The search center generated by the search center generating device 8 can be determined, for example, by the center vector of the motion vector in the following manner.

In the case that the block size selecting device 5 indicates the second block size, the center vector (leading end) of the motion vector with respect to the blocks (a-1) and (a-3) is set to a search center of a block (b-1), and the center vector of the motion vector with respect to the blocks (a-2) and (a-4) is set to a search center of a block (b-2).

In the case that the block size selecting device 5 indicates the third block size, the center vector of the motion vector with respect to the blocks (a-1) and (a-2) is set to a search center of a block (c-1), and the center vector of the motion vector with respect to the blocks (a-3) and (a-4) is set to a search center of a block (c-2).

In the case that the block size selecting device 5 indicates the fourth block size, the center vector of the motion vector with respect to the blocks (a-1), (a-2), (a-3) and (a-4) is set to a search center.

When the motion search determining device 7 determines that the search should be executed, a search area generating device determines a search area at a time when the selected block size motion searching device 10 executes the motion search, on the basis of the feature value extracted by the feature extracting device 6, and gives the search area to the selected block size motion searching device 10. The search area generated by the search area generating device 9 can be determined, for example, on the basis of the vector distance between the motion vectors in accordance with the following manner.

In the case that the block size selecting device 5 indicates the second block size, a pixel area in which the distance between the motion vectors with respect to the blocks (a-1) and (a-3) is a radius, is set as the search area of the block (b-1), and a pixel area in which the distance between the motion vectors with respect to the blocks (a-2) and (a-4) is a radius, is set as the search area of the block (b-2).

In the case that the block size selecting device 5 indicates the third block size, a pixel area in which the vector distance between the motion vectors with respect to the blocks (a-1) and (a-2) is a radius, is set as the search area of the block (c-1), and a pixel area in which the vector distance between the motion vectors with respect to the blocks (a-3) and (a-4) is a radius, is set as the search area of the block (c-2).

In the case that the block size selecting device 5 indicates the fourth block size, a pixel area in which the maximum value of the vector distances between the motion vectors with respect to the blocks (a-1), (a-2), (a-3) and (a-4) is a radius, is set as the search area.

The selected block size motion searching device 10 executes the motion search between the reference picture in which the center position is corrected by the search center determined by the search center generating device 8, and the input picture, in the search area indicated by the search area generating device 9. In this case, a prediction error is also derived from the selected block size motion searching device 10 in the process of the motion search, and the prediction error is given to the block size determining device 11 together with the motion vector.

The motion vector and the prediction error which are determined by the first block size motion searching device 4, and the motion vector and the prediction error which are determined by the selected block size motion searching device 10 are given to the block size determining device 11.

The block size determining device 11 determines a block size having a highest coding efficiency on the basis of a coding length of each of the block size with respect to the motion vector and the prediction error, and delivers the determined block size and the motion vector in correspondence to the block size mentioned above.

Figure 4:
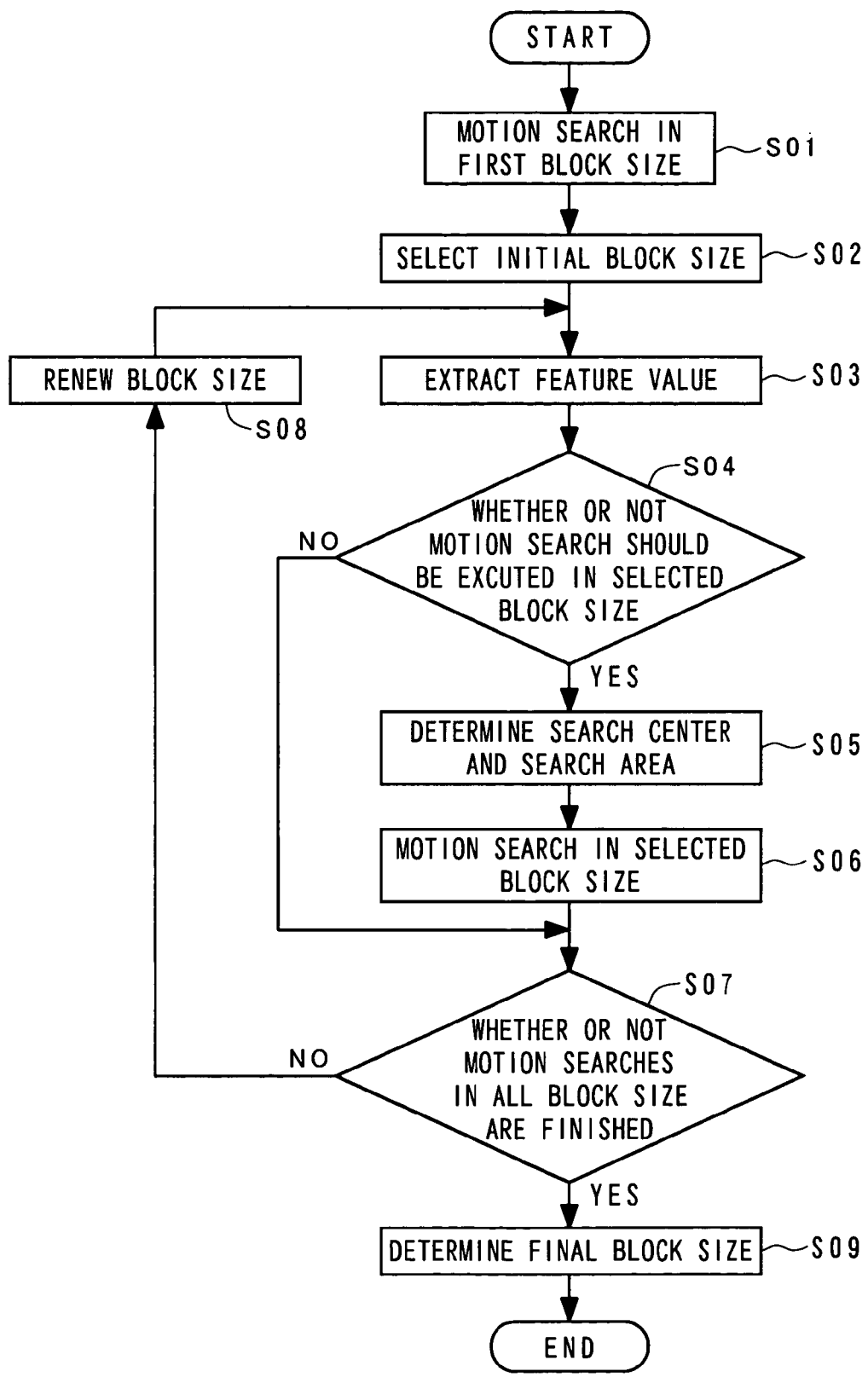
FIG. 4 is a flow chart showing a motion of one embodiment in accordance with the present invention.

FIG. 4 is a flow chart showing an operation of one embodiment in accordance with the present invention. First, the motion search in the first block size is executed between the input picture and the reference picture (S01). Accordingly, the motion vectors and the prediction error with respect to the block of the first block size are derived.

Next, an initial block size is selected (S02), and the feature value between the adjacent blocks in the block size is extracted (S03). In this case, in the embodiment mentioned above, the initial block size corresponds to the second block size, and the center vector of the motion vectors with respect to the blocks (b-1) and (b-2), the dispersion, the vector distance and the like are extracted as the feature value.

Next, it is determined on the basis of the extracted feature value whether or not the motion search should be executed by a unit of the initial block size (S04). The reference for the determination can be defined in accordance with the feature value such as the vector distance between the motion vectors and the dispersion thereof, as mentioned above.

When it is determined in S04 that the motion search should be executed (Y), the search center and the search area are determined (S05). The determination can be executed on the basis of the feature value such as the center vector of the motion vector and the vector distance as mentioned above.

Next, the motion search is executed between the input picture and the reference picture in accordance with the search center and the search area which are determined in S05. Accordingly, the motion vector and the prediction error with respect to the block of the initial block size can be derived.

In the case that it is determined in S04 that the motion search should not be executed (N), or in the case that it is determined in S06 that the motion search with respect to the initial block is finished, the step goes to S07, and it is determined whether or not the motion search with respect to the blocks in all the block sizes is finished. In this case, when it is determined that the motion searches with respect to the blocks in all the block sizes are finished, the block size having the highest coding efficiency is finally determined on the basis of the motion vectors and the prediction errors which have been derived (S09).

When it is determined in S07 that the motion searches with respect to the blocks in all the block sizes are not finished, the block size is renewed to the next block size (S08), and the steps from S03 are repeated. In the example mentioned above, the steps S03 to S08 are repeated with respect to the blocks in the third block size and the fourth block size, and when the process with respect to the block in the fourth block size is finished, the step goes to S09.

The description is given above of the example in which the motion picture coding system is constituted by H.264/MPEG-4 AVC (Advanced Video Coding), and a search unit is constituted by variable block sizes comprising the first block size (FIG. 1A), the second block size (FIG. 1B) having the double height of the first block size, the third block size (FIG. 1C) having the double width of the first block size and the fourth block size (FIG. 1D) having the double width and the double height of the first block size, as shown in FIGS. 1A, 1B, 1C and 1D. However, the coding system, the block size and the block number in the present invention are not limited to them. The present invention can be applied to general application and general coding apparatus utilizing the motion picture.

What is claimed is:

1. A motion vector detecting apparatus for detecting a motion vector between sequentially input picture signals, a currently input picture signal being divided into blocks prior to encoding, the blocks having variable block size ranging from a first block size to an nth block size (n is an integral number equal to or more than 2) without selectively extracting pixel data from the input picture signals where the first block size is a smallest block size and the blocks having block sizes from the second block size to the nth block size include the block having the first block size, comprising:
  a first motion vector detecting means for detecting a motion vector for each of the blocks in the currently input picture signal divided into blocks having the first block size;
  a feature value detecting means for detecting a feature value between adjacent blocks inside the currently input picture on the basis of the motion vectors detected by the first motion vector detecting means, wherein the feature value is a vector distance between the motion vectors detected by the first motion vector detecting means or a dispersion thereof; and
  a second motion vector detecting means for determining respectively whether or not a motion search should be executed by each unit of the block sizes ranging from the second block size to the nth block size on the basis of the feature value detected by the feature value detecting means, selecting a block size from the second block size to the nth block size according to the result of the determining and detecting a motion vector for each of the blocks in the currently input picture signal having the selected block size.

2. A motion vector detecting apparatus as claimed in claim 1, wherein the second motion vector detecting means determines a search center on the basis of the feature value detected by the feature value detecting means, and detects the motion vector with respect to the blocks in the second to nth block sizes.

3. A motion vector detecting apparatus as claimed in claim 1, wherein the feature value detecting means further detects a center vector of the motion vectors detected by the first motion vector detecting means as the feature value, and the second motion vector detecting means determines a search center by utilizing the center vector.

4. A motion vector detecting apparatus as claimed in claim 1, wherein the second motion vector detecting means determines a search area on the basis of the feature value detected by the feature value detecting means, and detects the motion vector with respect to the blocks in the second to nth block sizes.

5. A motion vector detecting apparatus as claimed in claim 1, wherein the variable block sizes are constituted by a first block size, a second block size having a double height of the first block size, a third block size having a double width of the first block size, and a fourth block size having a double width and a double height of the first block size, the feature value detecting means detects the vector distance between the motion vectors detected by the first motion vector detecting means, and the second motion vector detecting means selects the third block size and detects the motion vector in the case that the vector distance between the motion vectors with respect to the blocks in the first block size adjacent in a horizontal direction is small.

6. A motion vector detecting apparatus as claimed in claim 1, wherein the variable block sizes are constituted by a first block size, a second block size having a double height of the first block size, a third block size having a double width of the first block size, and a fourth block size having a double width and a double height of the first block size, the feature value detecting means detects the vector distance between the motion vectors detected by the first motion vector detecting means, and the second motion vector detecting means selects the second block size and detects the motion vector in the case that the vector distance between the motion vectors with respect to the blocks in the first block size adjacent in a vertical direction is small.

7. A motion vector detecting apparatus as claimed in claim 1, wherein the variable block sizes are constituted by a first block size, a second block size having a double height of the first block size, a third block size having a double width of the first block size, and a fourth block size having a double width and a double height of the first block size, the feature value detecting means detects the vector distance between the motion vectors detected by the first motion vector detecting means, and the second motion vector detecting means selects the fourth block size and detects the motion vector in the case that the vector distance between the motion vectors with respect to all the blocks in the first block size is small.

8. A motion vector detecting apparatus as claimed in claim 1, wherein the variable block sizes are constituted by a first block size, a second block size having a double height of the first block size, a third block size having a double width of the first block size, and a fourth block size having a double width and a double height of the first block size, the feature value detecting means detects the vector distance between the motion vectors detected by the first motion vector detecting means or the dispersion, and the second motion vector detecting means selects at least one of the second to fourth block sizes in accordance with the vector distance between the motion vectors with respect to the blocks in the first block size or the dispersion and detects the motion vector.

9. A motion vector detecting method of detecting a motion vector between sequentially input picture signals, a currently input picture signal being divided into blocks prior to encoding, the blocks having variable block size ranging from a first block size to an nth block size (n is an integral number equal to or more than 2) without selectively extracting pixel data from the input picture signals where the first block size is a smallest block size and the blocks having block sizes from the second block size to the nth block size include the block having the first block size, comprising:

detecting motion vectors for each of the respective blocks in the currently input picture signal divided into blocks having the first block size;

detecting a feature value between adjacent blocks inside the currently input picture signal on the basis of the motion vectors detected by the step of detecting motion vectors for each of the respective blocks having the first block size, wherein the feature value is a vector distance between the motion vectors detected by the detecting motion vectors for each of the respective blocks having the first block size or a dispersion thereof;

determining respectively whether or not a motion search should be executed by each unit of the block sizes ranging from the second block size to the nth block size on the basis of the feature value detected by the step of detecting the feature value;

selecting a block size from the second block size to the nth block size according to the result of the determining; and detecting motion vectors for each of the respective blocks in the currently input picture signal having the selected block size.

10. A motion vector detecting method as claimed in claim 9, wherein the determining includes determining a search center on the basis of the feature value detected by the detecting.

11. A motion vector detecting method as claimed in claim 10, wherein the detecting a feature value includes detecting a center vector of the motion vectors detected by the detecting motion vectors for each of the respective blocks in the currently input picture signal divided into blocks having the first block size as the feature value, and the determining determines the search center by utilizing the center vector.

12. A motion vector detecting method as claimed in claim 9, wherein the determining further comprises determining a search area on the basis of the feature value detected by the detecting.

13. A motion vector detecting method as claimed in claim 9, wherein the variable block sizes are constituted by a first block size, a second block size having a double height of the first block size, a third block size having a double width of the first block size, and a fourth block size having a double width and a double height of the first block size, the detecting the feature value detects the vector distance between the motion vectors detected by the detecting motion vectors for each of the respective blocks having the first block size, the selecting selects a third block size, and the detecting motion vectors having the selected block size detects the motion vector in the case that the vector distance between the motion vectors with respect to the blocks in the first block size adjacent in a horizontal direction is small.

14. A motion vector detecting method as claimed in claim 9, wherein the variable block sizes are constituted by a first block size, a second block size having a double height of the first block size, a third block size having a double width of the first block size, and a fourth block size having a double width and a double height of the first block size, the detecting the feature value detects the vector distance between the motion vectors detected by the detecting motion vectors for each of the respective blocks having the first block size, the selecting selects the second block size, and the detecting motion vectors having the selected block size detects the motion vector in the case that the vector distance between the motion vectors with respect to the blocks having the first block size adjacent in a vertical direction is small.

15. A motion vector detecting method as claimed in claim 9, wherein the variable block sizes are constituted by a first block size, a second block size having a double height of the first block size, a third block size having a double width of the first block size, and a fourth block size having a double width and a double height of the first block size, the detecting the feature value detects the vector distance between the motion vectors detected by the detecting motion vectors for each of the respective blocks having the first block size, the selecting selects a fourth block size, and the detecting motion vectors having the selected block size detects the motion vectors in the case that the vector distance between the motion vectors with respect to all the blocks in the first block size is small.

16. A motion vector detecting method as claimed in claim 9, wherein the variable block sizes are constituted by a first block size, a second block size having a double height of the first block size, a third block size having a double width of the first block size, and a fourth block size having a double width and a double height of the first block size, the detecting the feature value detects the vector distance between the motion vectors detected by the detecting motion vectors for each of the respective blocks having the first block size, the selecting selects at least one of the second block size to a fourth block size in accordance with the vector distance between the motion vectors with respect to the blocks having the first block size.

\* \* \* \* \*